US008387499B2

(12) United States Patent
Westfall et al.

(10) Patent No.: US 8,387,499 B2
(45) Date of Patent: Mar. 5, 2013

(54) LINEAR SAW WITH STAB-CUT BEVEL CAPABILITY

(75) Inventors: Brian Westfall, Cleburne, TX (US); David L. McAdoo, Alvarado, TX (US); Richard Zeinert, Carrollton, TX (US); Andrew Lashley, Grand Prairie, TX (US); Brent McMillan, Murphy, TX (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/448,731

(22) Filed: Apr. 17, 2012

(65) Prior Publication Data
US 2012/0198976 A1 Aug. 9, 2012

Related U.S. Application Data

(62) Division of application No. 12/052,448, filed on Mar. 20, 2008, now abandoned.

(51) Int. Cl.
*B26D 1/00* (2006.01)
*B27B 5/00* (2006.01)

(52) U.S. Cl. ................. 83/35; 83/56; 83/471.3

(58) Field of Classification Search ............... 83/23, 34, 83/35, 36, 42, 56, 300, 287, 471.2, 471.3, 83/339, 350, 353, 337, 109, 298, 385, 208, 83/438
See application file for complete search history.

(56) References Cited

U.S. PATENT DOCUMENTS

| 2,550,191 | A | * | 4/1951 | Godat | 83/287 |
|---|---|---|---|---|---|
| 2,621,686 | A | * | 12/1952 | Tompkins | 144/103 |
| 3,302,669 | A | * | 2/1967 | Edler | 83/471.3 |
| 3,482,610 | A | * | 12/1969 | Botefuhr | 83/471.3 |
| 3,491,805 | A | * | 1/1970 | Riedener | 83/471.2 |
| 3,665,982 | A | * | 5/1972 | Kvalheim | 83/404.2 |
| 3,719,113 | A | * | 3/1973 | Gerber et al. | 83/56 |
| 3,807,261 | A | * | 4/1974 | Couvreur | 83/879 |
| 3,910,142 | A | * | 10/1975 | Jureit et al. | 83/74 |
| 4,017,976 | A | | 4/1977 | Barr | |
| 4,195,346 | A | | 3/1980 | Schroder | |
| 4,277,998 | A | | 7/1981 | Mayo | |
| 4,316,400 | A | | 2/1982 | Mayo | |
| 4,410,022 | A | * | 10/1983 | Peterson | 144/48.6 |
| 4,452,117 | A | * | 6/1984 | Brickner et al. | 83/468 |
| 4,461,196 | A | | 7/1984 | Schramm, II | |
| 4,524,894 | A | * | 6/1985 | Leblond | 225/2 |
| 4,545,274 | A | * | 10/1985 | Germond | 83/486.1 |
| 4,576,076 | A | | 3/1986 | Pyle | |
| 4,641,557 | A | * | 2/1987 | Steiner et al. | 83/76.7 |
| 4,797,963 | A | | 1/1989 | Oppeneer | |
| 4,920,495 | A | * | 4/1990 | Pilkington | 700/195 |
| 4,958,544 | A | * | 9/1990 | Miyamoto | 83/471.3 |
| 5,297,463 | A | | 3/1994 | O'Banion | |
| 5,568,756 | A | * | 10/1996 | Peterson | 83/471.2 |
| 5,943,239 | A | * | 8/1999 | Shamblin et al. | 700/160 |
| 6,056,682 | A | * | 5/2000 | Belanger et al. | 493/340 |
| 6,212,983 | B1 | * | 4/2001 | Pyle | 83/34 |
| 6,263,773 | B1 | * | 7/2001 | McAdoo et al. | 83/75.5 |

(Continued)

*Primary Examiner* — Sean Michalski
(74) *Attorney, Agent, or Firm* — Booth Albanesi Schroeder LLC

(57) ABSTRACT

A method for automatically cutting a workpiece comprising the steps of moving a workpiece along its longitudinal axis, positioning a cutting blade by rotating the blade about a vertical axis, positioning the cutting blade by rotating about a bevel axis, and vertically moving the blade into cutting contact with the workpiece, thereby stab cutting the workpiece and creating a bevel cut. The method may also comprise moving the blade along a transverse axis. Further steps may include moving the cutting blade along a transverse axis simultaneous to moving the workpiece along it longitudinal axis, thereby creating a scarf cut.

7 Claims, 11 Drawing Sheets

U.S. PATENT DOCUMENTS

| | | |
|---|---|---|
| 6,539,830 B1 * | 4/2003 | Koskovich ........................ 83/13 |
| 6,640,855 B2 * | 11/2003 | Giles ............................. 144/357 |
| 6,899,005 B1 | 5/2005 | O'Banion |
| 7,000,658 B1 * | 2/2006 | Soukiassian et al. .......... 144/3.1 |
| 7,331,267 B2 * | 2/2008 | Urmson .......................... 83/651 |
| 2001/0000856 A1 * | 5/2001 | O'Banion ..................... 83/76.9 |
| 2002/0194967 A1 * | 12/2002 | Prust et al. ..................... 82/120 |
| 2004/0069106 A1 * | 4/2004 | McAdoo ........................... 83/34 |
| 2006/0219073 A1 * | 10/2006 | Urmson .......................... 83/469 |
| 2008/0110311 A1 * | 5/2008 | Stangherlin ..................... 83/177 |
| 2008/0223188 A1 * | 9/2008 | Snartland et al. ............ 83/471.3 |
| 2009/0241747 A1 * | 10/2009 | Dale et al. ...................... 83/171 |
| 2009/0266211 A1 * | 10/2009 | Westfall et al. ................. 83/208 |
| 2009/0308217 A1 * | 12/2009 | Serrano ........................ 83/471.2 |

* cited by examiner

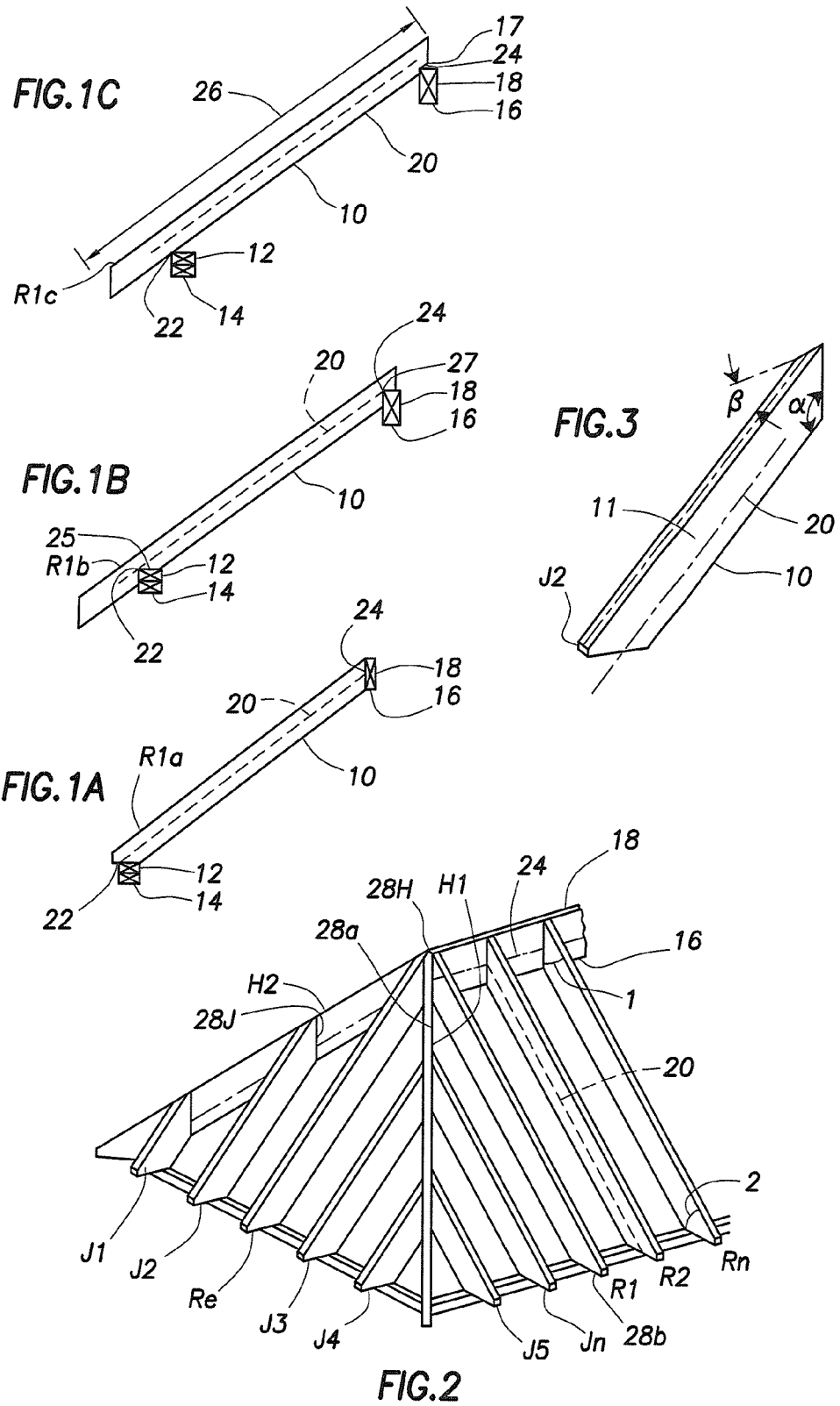

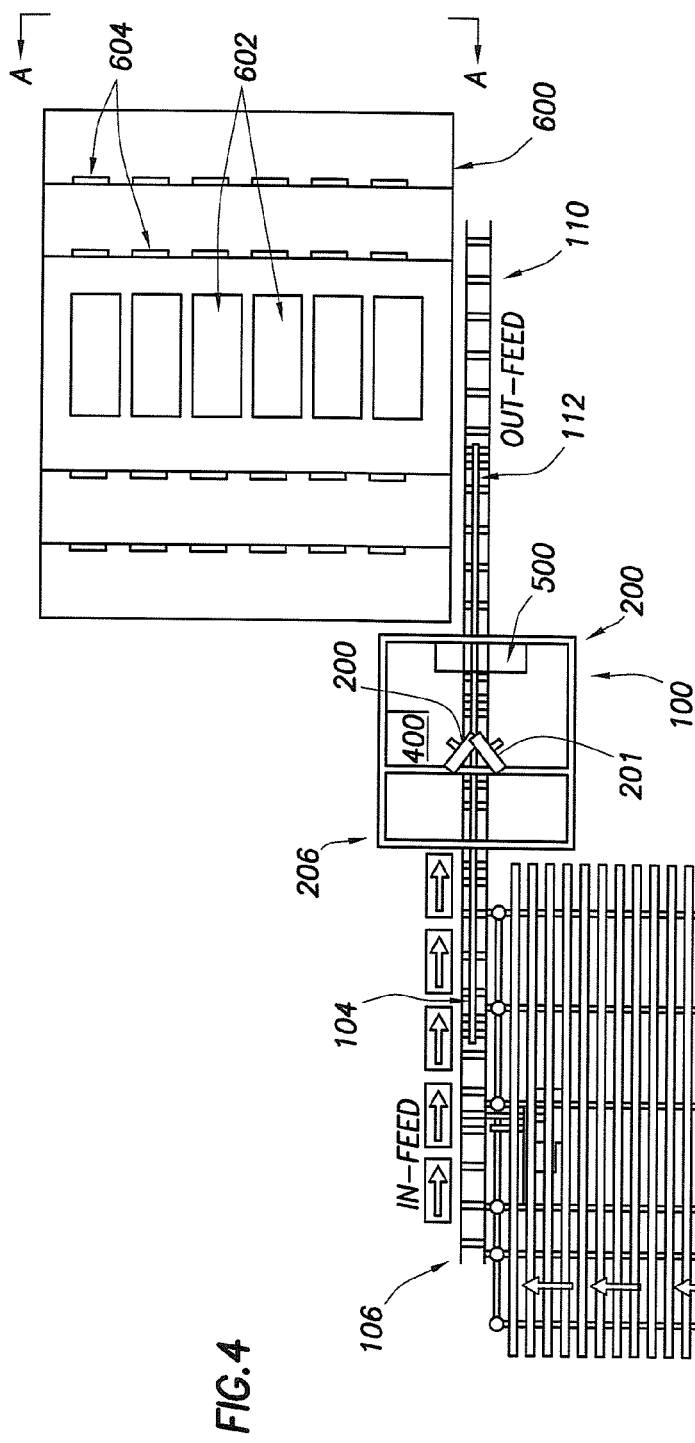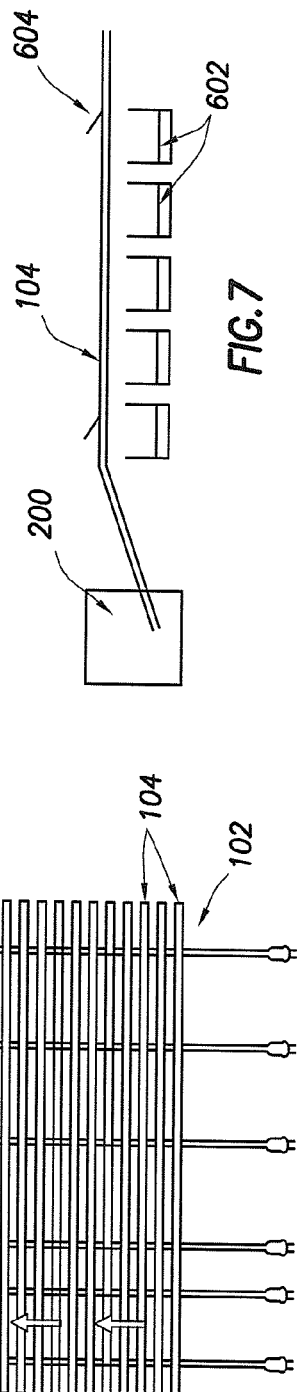

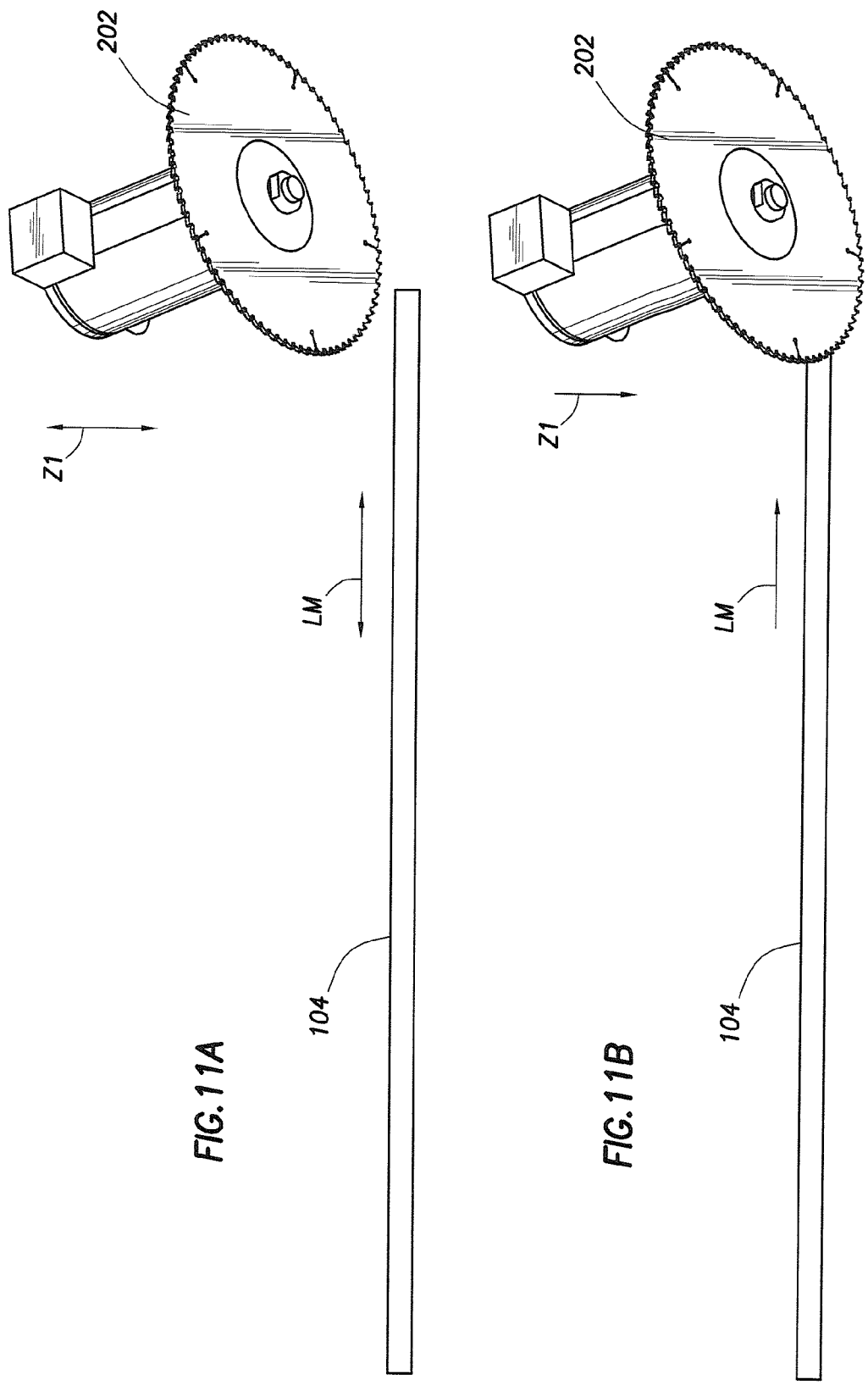

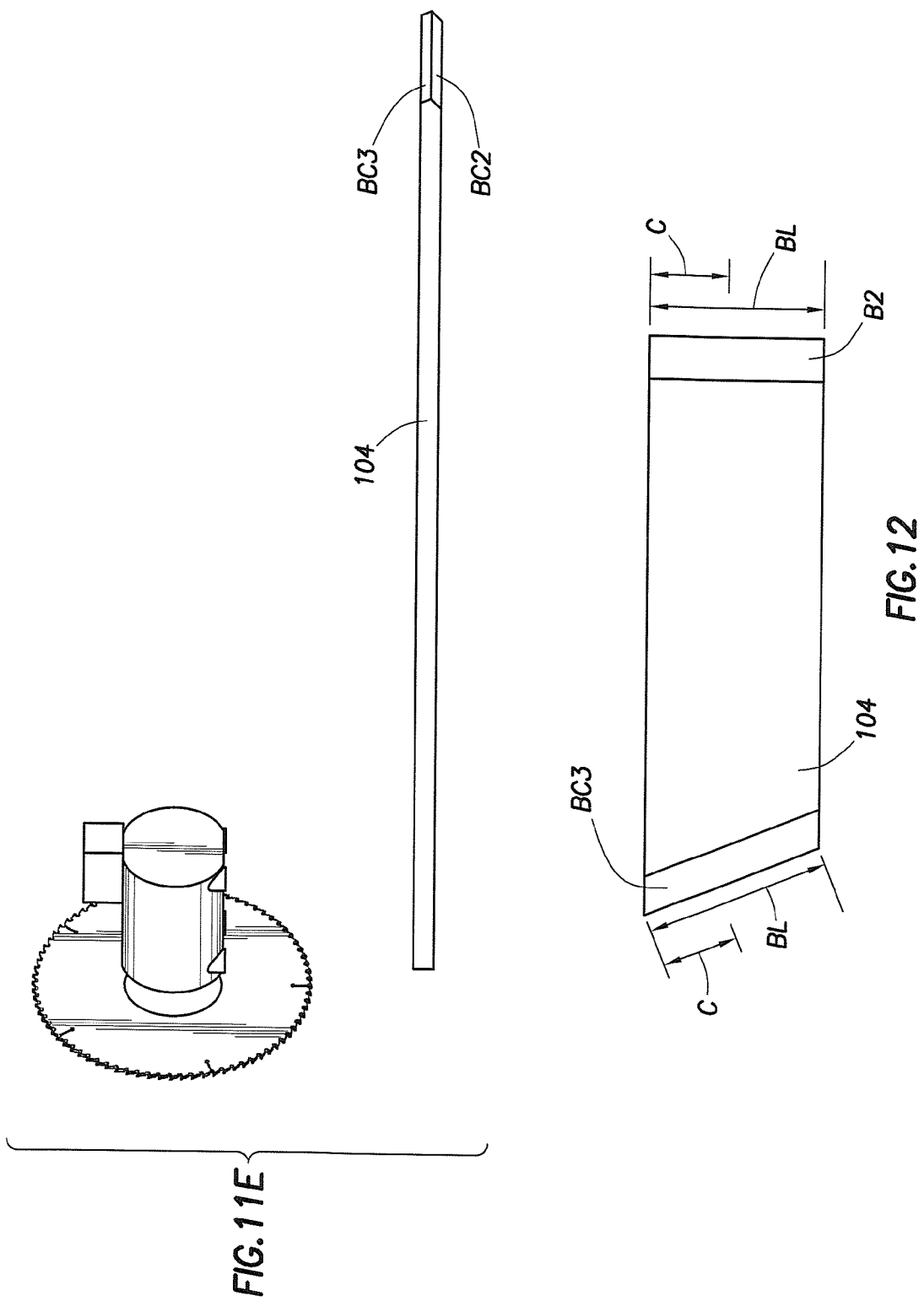

LINEAR SAW WITH STAB-CUT BEVEL CAPABILITY

CROSS-REFERENCE TO RELATED APPLICATIONS

This application is a divisional application of U.S. patent application Ser. No. 12/052,448 which is a continuation of U.S. patent application Ser. No. 10/681,884, filed Oct. 8, 2003 entitled "LINEAR SAW WITH STAB-CUT BEVEL CAPABILITY," the disclosures of which are incorporated herein by reference in their entirety for all purposes. The 12/052,448 application is also a Continuation-in-Part of U.S. patent application Ser. No. 10/270,849, filed Oct. 14, 2002, entitled "LINEAR FEED CUTTING APPARATUS AND METHOD."

FIELD OF THE INVENTION

This invention relates, in general, to an apparatus for the cutting of wood components, namely, dimension lumber into finished rafters having predetermined lengths and angles at the ends thereof, for use in building construction. In particular, this invention relates to an apparatus, including a novel linear feed table and adjustable cutting device, for processing workpieces into finished components for assembly, and to a computer control and program for controlling same.

BACKGROUND OF THE INVENTION

Most lumber used in the construction industry is known as dimension lumber, which the present invention is intended to use. Dimension lumber has opposite sides parallel, with adjacent sides forming a right angle, and is generally known by the nominal dimensions of the sides, e.g., 2×4, 2×6, 4×8, etc. The longer sides hereinafter are called "faces," and the shorter sides are called "edges." The pieces of dimension lumber to be processed by the present invention are called "workpieces" herein and, after cutting or processing, are called "components," e.g., rafters of several kinds, and webs and chords for trusses.

There are three kinds of components with which the present invention is primarily concerned:
1. "regular" components:
   those which intersect their support or supported members, e.g. plates or ridge beams, at right angles to the faces, but at an angle to the edges thereof;
2. "jack" components:
   those which, at one end, intersect at least one of their support or supported members at something other than a right angle to each of the faces and edges of the component, requiring a cut at what is called hereinafter a "compound" angle or a "bevel" cut on that end of the rafter; and
3. "hip" and "valley" components:
   those which intersect their support or supported members where two or more come together at an angle, requiring two cuts on that end of the component, one or both of which may be compound angles; the angle at which the support or supported members come together is often, but not always, a right angle.

FIG. 2 illustrates each of these kinds of components.

The present invention is also useful in cutting all of the webs and chords for a single truss in one operation. Typically, an individual component for a number of trusses was made up at the same time, to reduce the amount of hand adjustment, and therefore cost, per component. Otherwise, it became very expensive to produce them for a single truss, since adjustments had to be made between the cutting of each different component. Alternately, workpieces were fed into a cutting apparatus laterally, as opposed to linearly, as in the present invention. Lateral feed assemblies allow for simultaneous cutting of the ends of the workpieces, but are not as efficient where the saw blades must reset between each workpiece.

To lay out a roof structure, certain distances must be accurately known:
1. the distance between the outside edges of the double top plate;
2. the vertical distance from the upper face of the top-plate to the ridge line; and
3. the inclined, or slant, distance between the outside edge of the double top plates and the ridge line.

It will help in understanding the following discussion to refer to FIGS. 1A-C of the drawings herein, which disclose three typical arrangements of rafters and their associated support or supported members, and will help to illustrate the concepts of "measuring line" and "ridge line";
1. FIG. 1C discloses a rafter simply laid upon the double top plate and the ridge beam, without cutting the rafter, except perhaps for a small notch at the upper end where it rests on the ridge beam;
   a. the "measuring line" runs along the lower edge of the rafter, and
   b. the "ridge line" is at the bottom of the rafter where it meets the adjoining or complementary rafter.
2. FIG. 1B discloses a rafter notched at both upper and lower ends to fit over the ridge beam and the double top plate, respectively. In this case:
   a. the "measuring line" runs parallel to the rafter's lower edge, from the outer upper edge of the double top plates to the center line of the ridge beam above its upper edge; and
   b. the "ridge line" is at the intersection of the two rafter measuring lines.
3. FIG. 1A discloses a rafter cut at both upper and lower ends to rest against the face of the ridge beam and the upper face of the double top plate, and the lower edge of the rafter intersects the lower edge of the ridge beam and the inner edge of the double top plate. In this case:
   a. the "measuring line" runs parallel to the lower edge of the rafter, from the outer upper edge of the double top plates to the point of intersection of the measuring line with the face of the ridge beam; and
   b. the "ridge line" runs down the midpoint of the ridge beam intersecting the projection of the measuring line.

The first structure of FIG. 1C is an older method of construction little used at the present time.

The second and third structures of FIGS. 1B and 1A represent methods of construction which are more widely used at present.

Regular components, i.e., those on which the ends are cut at right angles to the faces (or the edges), even though the ends may be cut at something other than a right angle to the edges (or the faces, respectively), do not present a great problem to manufacture, since the length of a given component as measured on one face (or edge) is the same as the length measured on the other face (or edge).

However, hip, valley, and jack components present a more difficult problem of manufacture:
1. since jack components have at least one end thereof cut at a compound angle, i.e., an angle both to the edges and to the faces, the lengths of opposite faces (and/or edges) thereof are unequal; and 2. hip and valley components have at least one end which requires two cuts, both of which are at angles to the faces and edges, but which are usually at right angles to each other (although not necessarily). Although the lengths on the faces may be equal, the length on the measuring line will be different than both.

Present machinery for making cuts to produce composite or compound angles on roof structure components still requires substantial hand labor in the set-up and/or operation of cutting equipment.

U.S. Pat. No. 4,545,274 teaches a means of tilting the axis of travel of a saw blade to correspond to the complement of the roof slope, and then angling the saw blade to make the compound cut. Lumber is moved past the cutting station in a sideways manner. A separate cutting station is required for cuts on the other end of the component and, to cut components of differing lengths, one of the cutting stations must be movable in relation to the other, which takes time. Further, the cutting process is not automatic.

U.S. Pat. No. 6,212,983 incorporated herein by reference, teaches a linear feed system where compound cuts are achieved by tilting the work surface supporting the workpiece. This requires automating and adjusting the work surface to be movable for compound cuts. Adjusting workpieces of great length may prove cumbersome. An example of a lateral feed assembly can be found in Shamblin, U.S. Pat. No. 5,943,239, which is incorporated herein. Such a system employs four or more cutters and requires more work space and added expense.

There is no known linear feed machinery presently available to sequentially and automatically make the cuts necessary to achieve compound angles.

BRIEF DESCRIPTION OF THE DRAWINGS

FIGS. 1A-C are profile views of regular components as used in three typical installations, disclosing the parameters which establish the measuring and cutting points for the operation of the present invention.

FIG. 2 is an oblique view of a hip roof and its components, including rafters, showing the important structural relationships thereof.

FIG. 3 is an oblique view of a jack component, with the important lines and angles indicated thereon.

FIG. 4 is a top view of the present invention, disclosing the arrangement of the various major elements thereof.

FIG. 7 is a detail elevational view of a component sorter;

FIGS. 11A-E are elevations views of making bevel cuts at other than ninety degrees; and FIG. 12 is a top view showing relative lengths of bevel cuts and maximum cut length.

DETAILED DESCRIPTION OF A PREFERRED EMBODIMENT

Figure 5A:
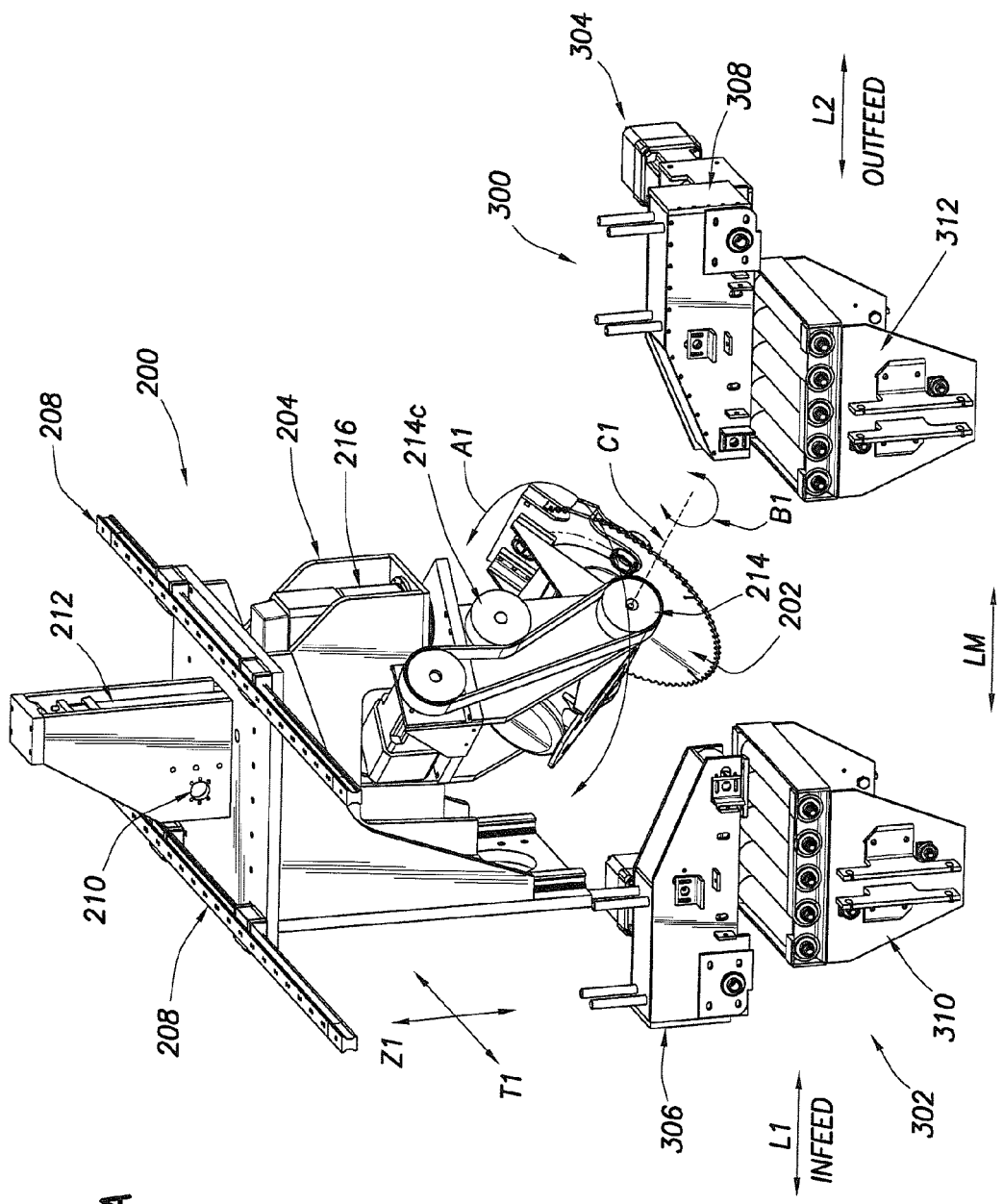
FIG. 5A is an orthogonal view of the cutting assembly in position to make a compound or bevel cut.

The present invention is an apparatus for making roof structure and other components from dimension lumber workpieces by making the required cuts in a sequential manner. Components such as hip, valley, and jack components, and webs and chords for trusses, are easily obtained.

As stated earlier, hereinafter "workpiece" refers to the unprocessed, or partially processed pieces of dimension lumber, while "component" refers only to the finished piece, after all processing has been performed.

It will be helpful to refer to FIGS. 1-3, in understanding the following preliminary description.

Regular components, as disclosed in FIGS. 1A-C, and especially as disclosed in place in FIG. 2, although having the ends thereof cut at angles other than a right angle to the component edges, have a right angle between the end of the component and its faces, requiring only that the cutting tool be at the proper angle to the edges to make the cut.

Hip, valley, jack, and some truss components require that the cutting tool cut at compound angles, sometimes on the same workpiece and on the same end thereof:

1. jack components, as disclosed in place in FIG. 2, and especially in FIG. 3, have at least one end thereof which is cut at an angle to both the edges and the faces, this is a "compound" angle or "bevel" cut;
2. hip components, as disclosed in FIG. 2., have at least one end which requires two cuts, both at compound angles to the faces and edges; and valley rafters (not shown in place) have the same form as hip rafters, but are needed where two sloping roofs create a valley, and present the same problems in cutting as a hip rafter.

FIG. 4 discloses, in a view from the top, the overall structure of the wood-handling apparatus 100. The wood-handling apparatus 100 preferably includes a live deck 102 for automatically supplying workpieces 104 to the infeed assembly 106. The infeed assembly 106 supplies workpieces 104, one at a time, in a linear feed, to the cutting assembly 200. The out-feed assembly 110 moves finished components 112 away from the cutting assembly 200.

The cutting assembly 200 is shown in more detail in FIGS. 5A-5D. The cutting assembly 200 has at least one cutting blade 202, here shown as a circular saw blade. FIG. 4 shows an optimal arrangement of a cutting assembly 200 with multiple cutting blades 201 and 202.

Cutting element 202 is mounted on saw-frame 204 and is movable in several directions. Element 202 is rotatable about its vertical axis V1, allowing rotational motion of the element 202 as shown by arrow A1. The cutting element 202 is shown in its upright or home position 205 in FIG. 5B. The cutting element 202 also moves vertically, allowing movement as indicated by the arrow Z1. The cutting element 202 is movable transversely, across the workpiece 104, as indicated by arrow T1. The cutting element 202 is finally rotatable about axis C1, allowing movement as indicated by arrow B1. Movement of the workpiece along path L, indicated by arrows L1 and L2, is controlled by linear feed assembly 300, the infeed feeder 302 and outfeed feeder 304 allowing lumber movement as indicated by arrow LM.

The practitioner will realize that the combination of movements allowed by the feed assembly 300 and cutting assembly 200 will enable simple and compound cuts to be made to a workpiece. The cutting assembly 300 is in position for a compound cut in FIG. 5A.

Figure 5B:
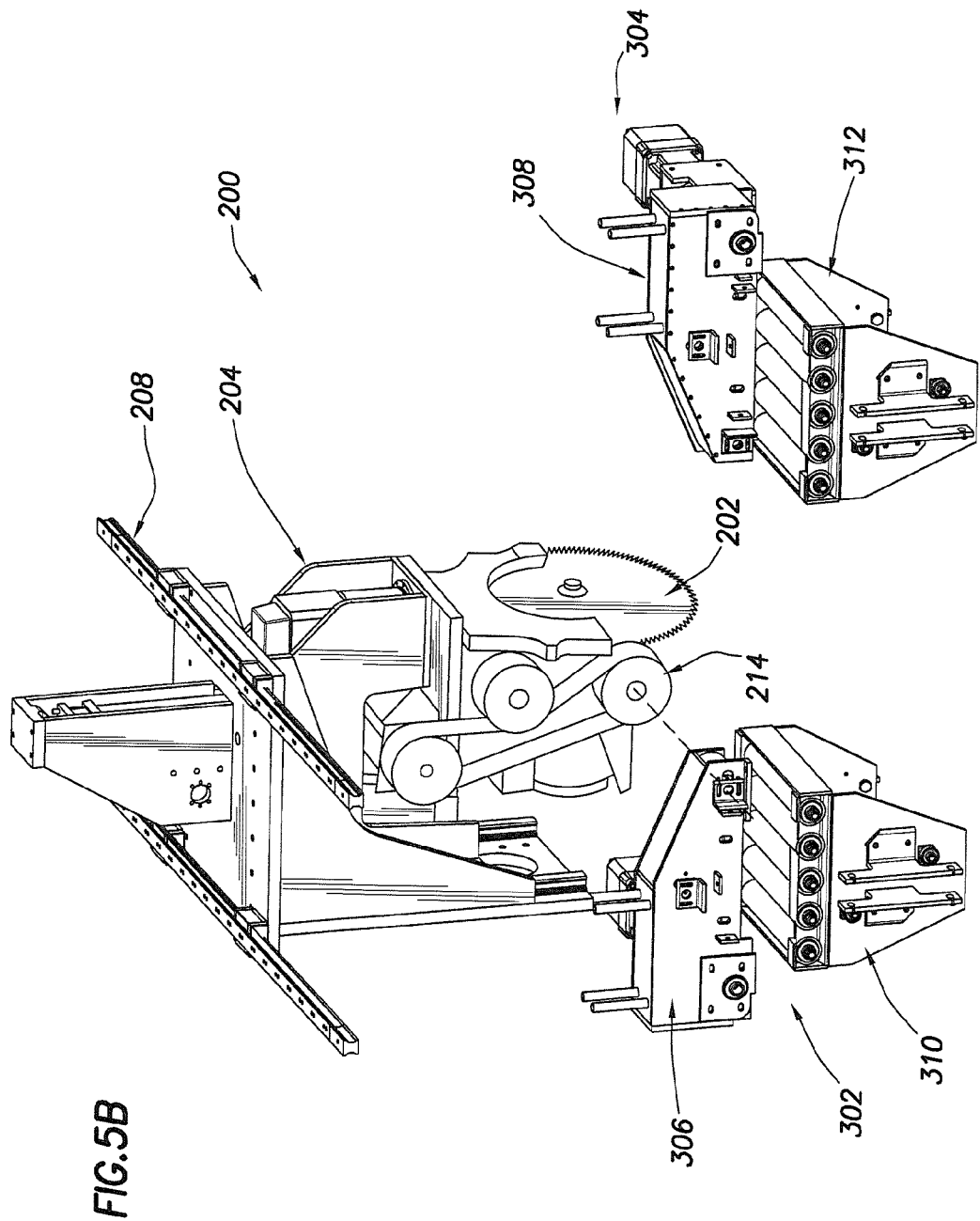
FIG. 5B is an orthogonal view of the cutting assembly in a home position.
Figure 5D:
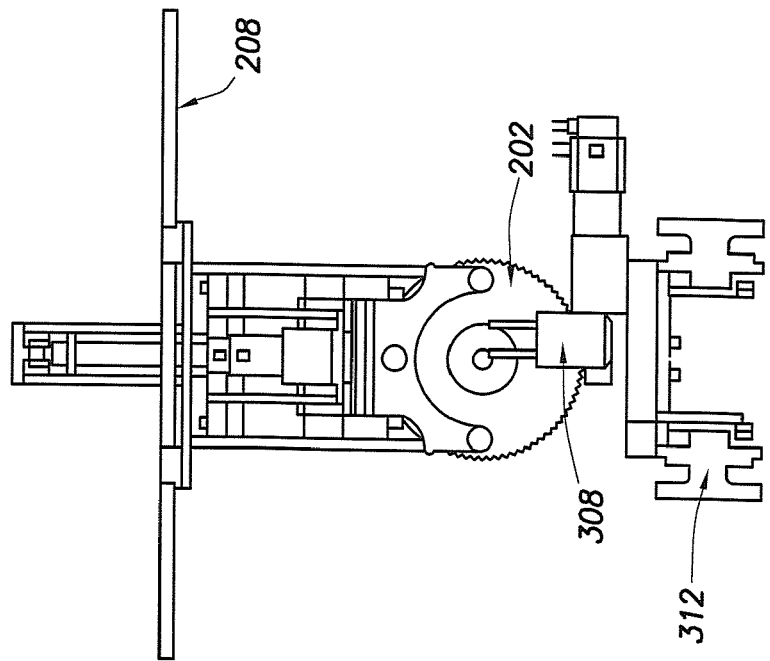
FIG. 5D is a right elevational view of the cutting assembly.
Figure 5C:
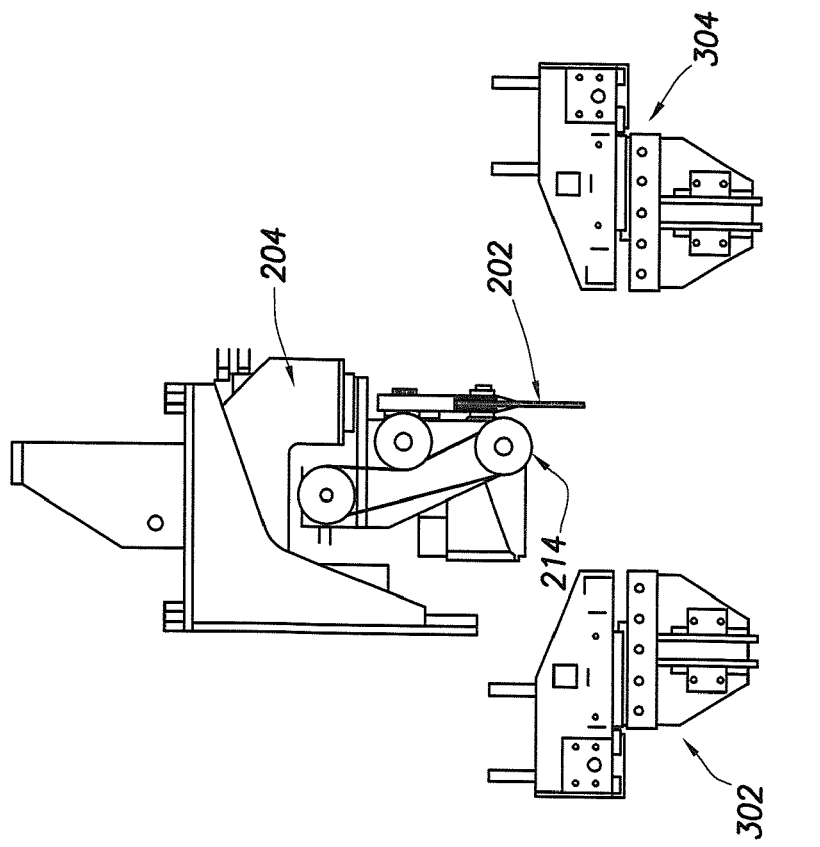
FIG. 5C is a front view of the cutting assembly.

The specific arrangement of the elements of the cutting assembly 200 is not important as long as each of the relative motions of the cutting element 202 is achieved. In a preferred embodiment, the saw frame 204 is mounted to a stable object, such as a saw enclosure 206. In this case, the frame 204 is slidably mounted to transverse rails 208. The frame 204 is movable in the transverse direction, along arrow T1, by movement along a ball-screw shaft (not shown) which interacts with aperture 210 in a manner known in the art. Piston-cylinder assembly 212 controls the movement of the cutting element 202 in the vertical plane, as indicated by arrow Z1. Rotation of the cutting element 202 is controlled by actuator 214, namely servomotor 213 and belt 215 and pulleys 214a, 214b and 214c allowing motion indicated by arrow B1 about horizontal axis 1, Axis C1 is collinear with the axis of pulley 214a as shown in FIGS. 5A-C. Similarly, rotation about the vertical pivot, movement along line A1, is controlled by an actuator 216. Note that in the preferred embodiment, movement in the transverse direction moves actuators 212, 214 and 216 along with all of frame 204. This arrangement can be modified as desired as long as movement is allowed in the desired directions. Further, the preferred embodiment utilizes convenient actuator mechanisms, but any means known in the art may be used to effect the various movements of the cutting elements.

Linear movement of the workpiece is handled by the linear feeder 300, namely the infeed feeder 302 and the outfeed feeder 304. Each feeder 302 and 304 has an upper component, 306 and 308, and a lower component 310 and 312, respectively. In the preferred embodiment, the upper components, 306 and 308, are the drive components. The upper components 306 and 308 are movable in the Z axis allowing the upper components to clamp down on a workpiece to effectuate movement thereof.

Figure 6:
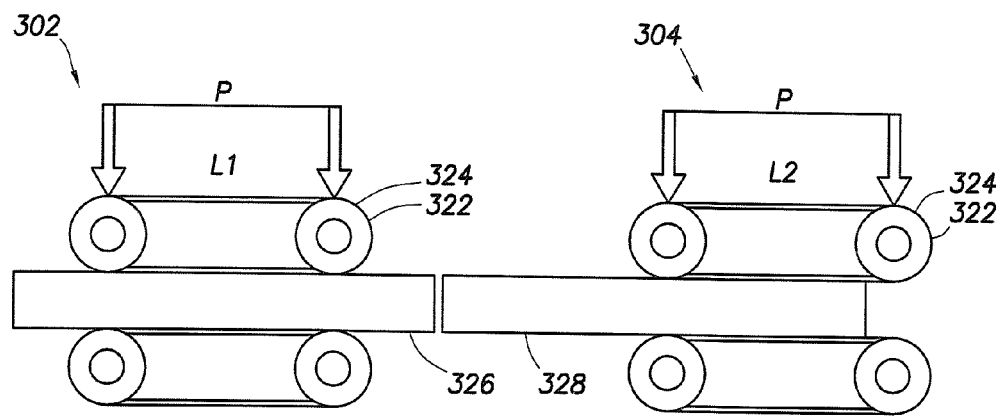
FIG. 6 is a detail schematic elevational view of the feeder assembly.

The linear feeder 300 further comprises sensors (not shown) for sensing the presence of a workpiece and locating the end thereof. Use of such sensors is known in the art. The upper components 306 and 308, seen in detail FIG. 6, have belts that press against the lumber and grip it against the lower components 310 and 312. The drive mechanism for the belt is a servomotor with a measuring device or encoder that measures the length of the workpiece as it feeds the lumber. Other drive mechanisms 324 and encoders 322 may be used, as are known in the art. The two units 302 and 304 are capable of working together, moving a single workpiece at the same rate, or independently. Independent functionality is necessary since a workpiece may be cut and the upstream piece 326 needs to be moved back out of the way to allow movement of downstream piece 328 for further cutting. The finished segment 328 can then be moved downstream to the out feed assembly 110. The feeder units 302 and 304 act to maintain the workpiece stable during cutting.

Preferably any workpiece that extends at least half-way through either feeder will be held steady enough to cut. Pressure can be supplied by springs, hydraulics or other known methods. The feed rolls shown are believed to provide better length measuring accuracy because they are not subject to errors introduced by warped lumber or surface imperfections. Other roller, drive and measuring means may be used, such as that described in U.S. Pat. No. 6,263,773 to McAdoo which is hereby incorporated for all purposes.

All of the motions of the saw elements and rollers are accurately controlled by computer 400. The computer 400 determines the manner in which to position the saw blade, actuates all motion of the blade elements and rollers, tracks the presence and length of workpieces, and operates to cut workpieces to the required length and shape.

The cutting assembly and roller feed assemblies are operably connected to the computer 400 through appropriate electronics as are known in the art. The computer enables the user to input the desired lengths of wood product needed for a particular job. The computer may optimize the cuts made in the wood product through an appropriate program. Further, the computer controls the cutting unit and the driving unit.

The computer receives input signals from at least the position sensors and encoders. The computer is operably connected to activate and control the driver assembly and pressure assembly for positioning the workpieces and the cutting unit. The computer receives input from the measuring assembly to determine the length of the workpiece and to determine the appropriate positioning of the workpiece in selecting the locations of the cuts to be made. The computer may optimize the cuts in the product by a method such as the one disclosed in U.S. Pat. No. 5,444,635 to Blaine, which is incorporated herein by reference.

It is possible to add a second cutting blade 201 to increase productivity. The second cutting blade 201 is similar to the first, 202, but preferably below-mounted such that the cutting blade moves upward to execute a cut. The second cutting blade 201 can be used to execute a cut while the first blade 202 is positioning itself.

The invention can also be combined with a marking assembly 500 as is known in the art, which can mark workpieces as to their size, shape, dimensions, or any other preferred indication.

The out feed system 110 can include a sorter, as seen in FIGS. 4 and 7, as is known in the art, to dump the cut components into carts or other handling mechanisms. The use of sorters 600 and carts 602, with flip-up arms 604 to direct components is well-known in the art and sorters are commercially available from Alpine Engineered Products, Inc.

Figure 8:
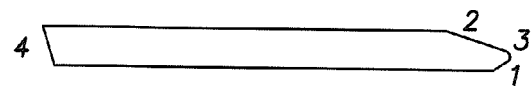
FIG. 8 is a sample workpiece.

In use, the cutting assembly can cut all types of components, including those with compound or bevel cuts. For all cut sequences, a sensor will detect the presence of a board and activate L1 to start the board into the saw. A second sensor will detect the leading edge of the board with sufficient precision to move the board into position for a first cut. All subsequent cuts will be under the precise control of the motion control system, so no other manual adjustments will be needed until a new board is fed into the machine. The motion control system will track and adjust for kerf material removed and end configuration resulting from previous cuts. As an example, FIG. 8 shows a component requiring multiple cuts. With a single-head saw 200, the blade would set up, execute cut 1, reposition and execute cut 2, etc., for all four cuts. If a first 200 and a second 201 cutting unit are employed, unit 200 would position and execute cut 1. Unit 201 would be positioning itself for cut 2 while cut 1 is being made. Unit 201 would then execute cut 2 while unit 200 positioned for cut 3, etc. Prior to cut 4, obviously, the linear feeders would forward and position the workpiece for the final cut. An infinite variety of cuts is possible.

Figure 9:
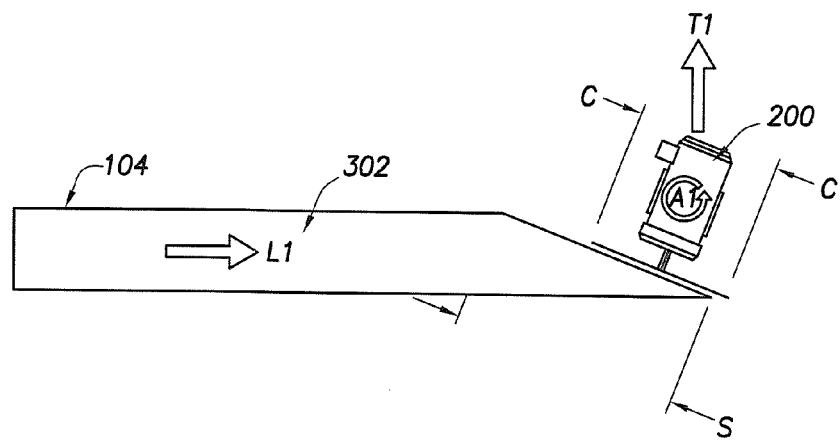
FIG. 9 is a schematic showing operation of the cutting assembly to create a scarf cut.

One type of cut which the prior art machines cannot handle is long scarf cuts. FIG. 9 shows a detail of cutting for scarf cuts. In a scarf cut, the cut length, S, required is greater than the maximum cut C of blade 202. For most cuts, cut length S will be less than maximum cut C. In a scarf cut, however, use of automated movement along axis T1 is employed to make a cut as needed. The workpiece 104 is shown in place, engaged by feed roller assembly 302. The computer 400 positions the cutting blade 202 at the appropriate angle about axis V1, and along other axes as necessary. The cutting blade 202 is lowered, along vertical axis Z1, into cutting contact with the workpiece 104, engaging the workpiece to the maximum cut length C. The workpiece 104, via feed roller 302, is then moved linearly while simultaneously the cutting blade 202 is moved along the T1 axis, thereby translating the blade to make scarf cut S. This type of cut is not possible without automated movement in the T1 axis.

Practitioners will also note that automated movement along the T1 axis allows the assembly to be used with varying widths of workpieces, e.g., 2, 4, 8 inches, without manual set up of the assembly or any accompanying downtime. This is another improvement offered by the present invention.

A compound or bevel cut can be made in a similar manner. The particulars of making compound or bevel cuts can be seen in FIGS. 10 and 11. A 90-degree bevel cut can be made using more than one method. In a 90-degree bevel cut, the angle between the cut across the face of the workpiece is at 90 degrees with respect to the intersection of the edge and face of the board. In one method, the blade 202 is moved vertically into position adjacent, but not in contact with, the workpiece 104. The blade 202 is rotated around axis C1 to the selected bevel angle either before, after or while the blade is lowered adjacent the workpiece. Once the saw blade 202 is positioned, the blade is translated along axis T1 across the face of the workpiece creating the 90-degree bevel cut.

In another method of creating a 90-degree bevel cut, shown in FIGS. 10A-D, a stab cut is used. That is, the blade contacts and cuts the workpiece during the vertical movement. The blade 202 is, in the case shown in FIGS. 5, 10 and 11 where the blade is above the workpiece, rotated around axis C1 to the selected angle and then lowered into workpiece 104. In this method of making a bevel cut BC, linear motion along or parallel to path LM by either the saw or the workpiece 104 is required simultaneously with the vertical motion of the saw into the workpiece 104. In a preferred embodiment, the linear motion of the workpiece 104 along path LM eliminates the need for the cutting element 202 or saw-frame 204 to move along the linear axis. The workpiece 104 is moved linearly along path LM simultaneous to the vertical movement of the blade 202 into the workpiece. Although the stab cut method is more complicated, requiring movement along more than one axis simultaneously, it is more efficient, requiring less time to make the cut. As those in the art will recognize, an equivalent alternative can be achieved by mounting the cutting element 202 to move along the linear axis L.

Figure 10A:
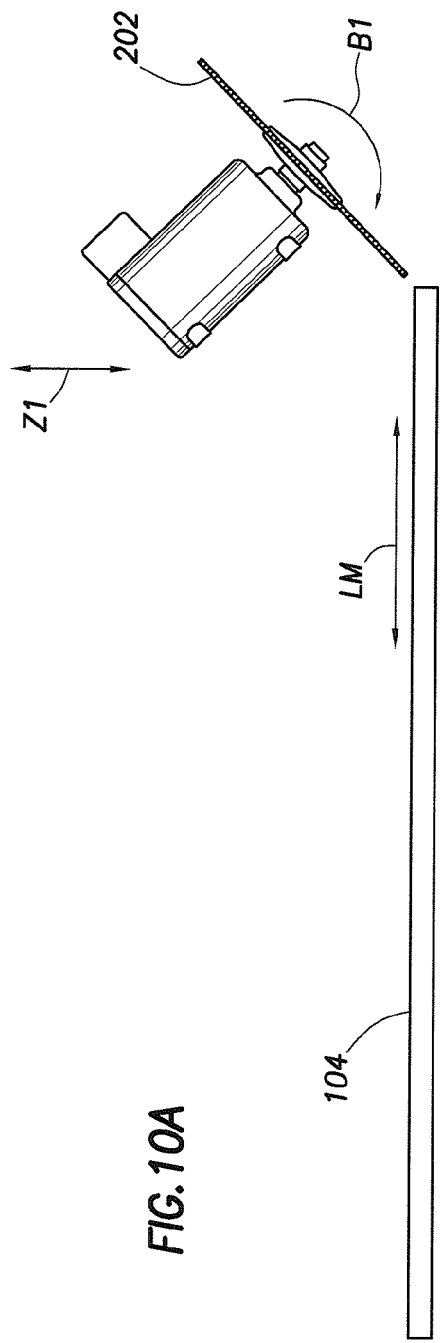
FIGS. 10A-D are elevations views of the process of making ninety-degree bevel cuts.
Figure 10B:
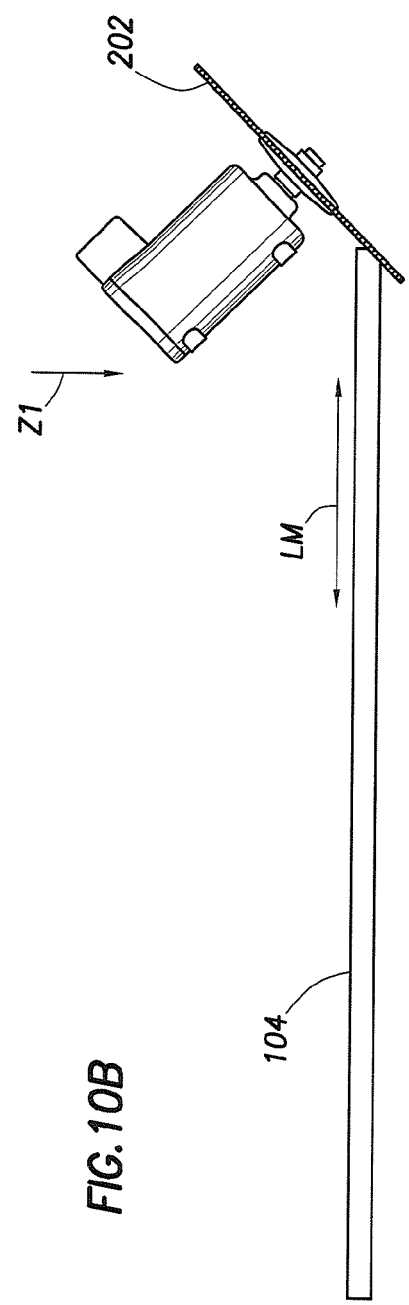
Figure 10C:
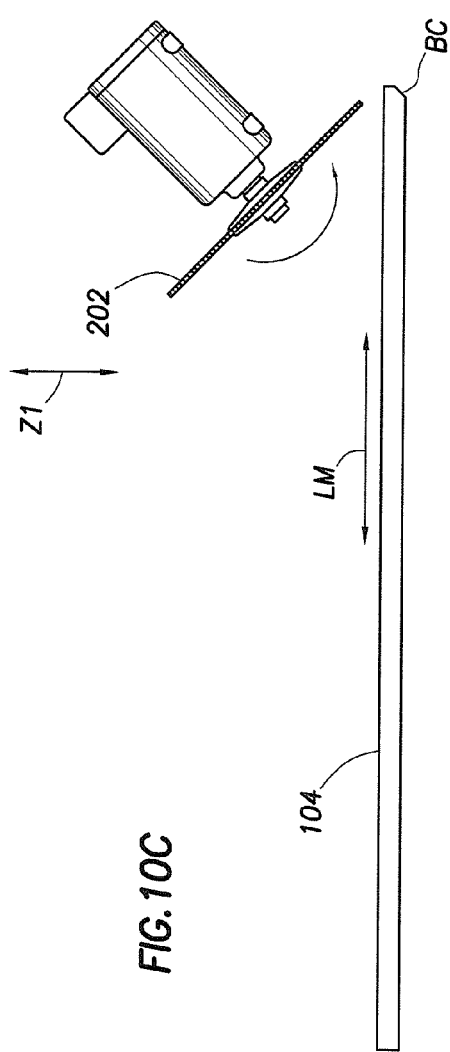
Figure 10D:
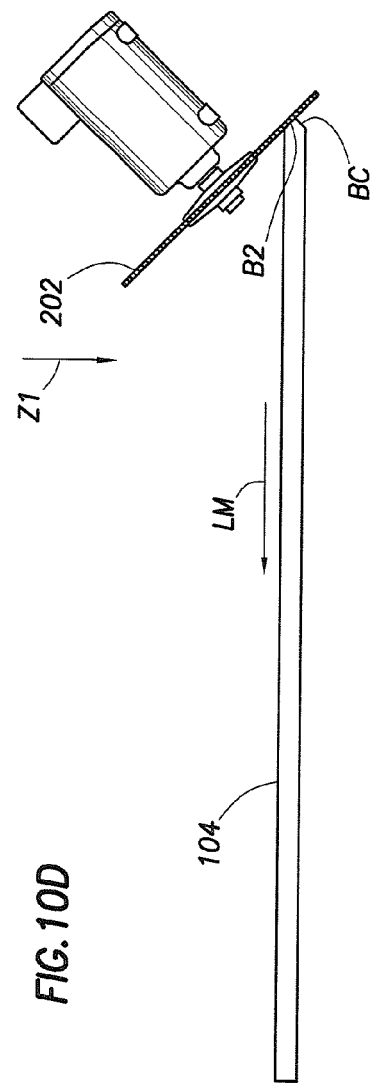

In FIG. 10A, the blade 202 is rotated along path B1, around axis C1, to the desired bevel angle and is directly above the workpiece 104. In FIG. 10B, the blade 202 is dropped vertically along axis Z1, while simultaneously, the workpiece is moved along path LM, left to right, to create 90-degree bevel cut B. The same process is repeated in FIGS. 10 C and D, but the workpiece is moved linearly right to left, as indicated by the arrow LM, to create 90-degree bevel cut B2 if desired.

Cutting element 202 has a maximum cut length C which is determined primarily by the size of the blade 202. This is the maximum length of cut the blade 202 can make with only a vertical movement, i.e., without translation movement across the face of the workpiece 104. As seen in FIG. 12, any compound or bevel cut has a necessary cut length BL. Where the cut length BL is longer than the maximum cut C, it is necessary to employ automated movement along transverse axis T1 after performing the stab cut to make the full cut. That is, the blade 202 is moved vertically along axis Z1 into contact with the board 104 while the board is moved along the L axis, resulting in a cut along part or all of cut length C, and then the blade is translated to complete the cut along cut length BL. In a preferred embodiment, the blade 202 is selected such that the maximum cut C is at least as long as the cut length BL. This allows for the elimination of any translation movement along axis T1 to make the bevel cut, simplifying and shortening the time necessary to make the cut. For example, since typical board widths are typically four inches across, selection of a blade with a cut width of at least six inches is suggested. Much larger blades, such as with maximum cut widths of six, eight, ten or twelve inches may be used.

Figure 11C:
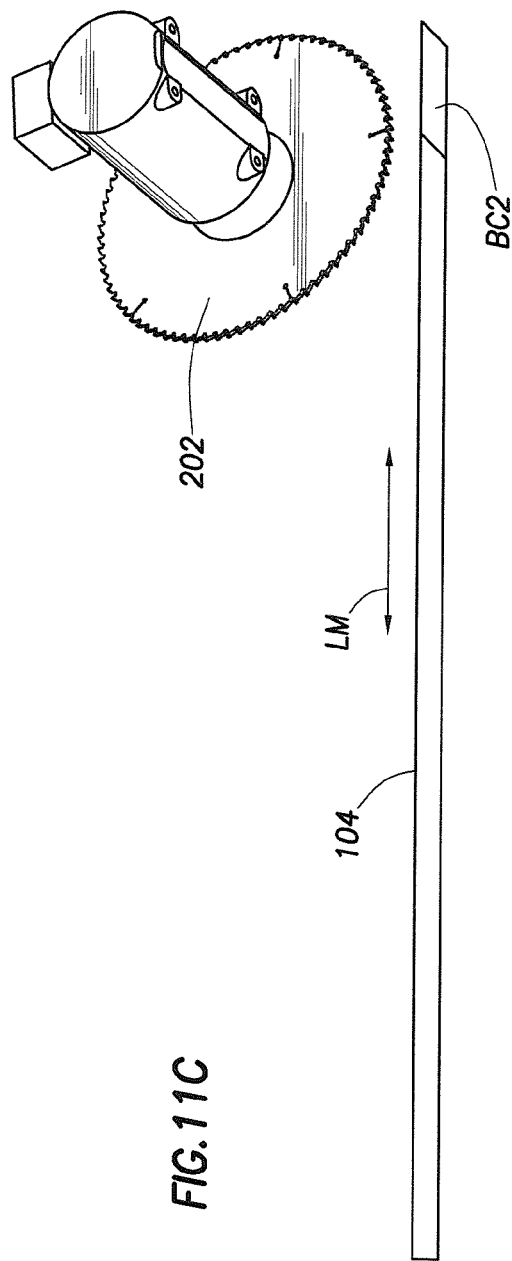
Figure 11D:
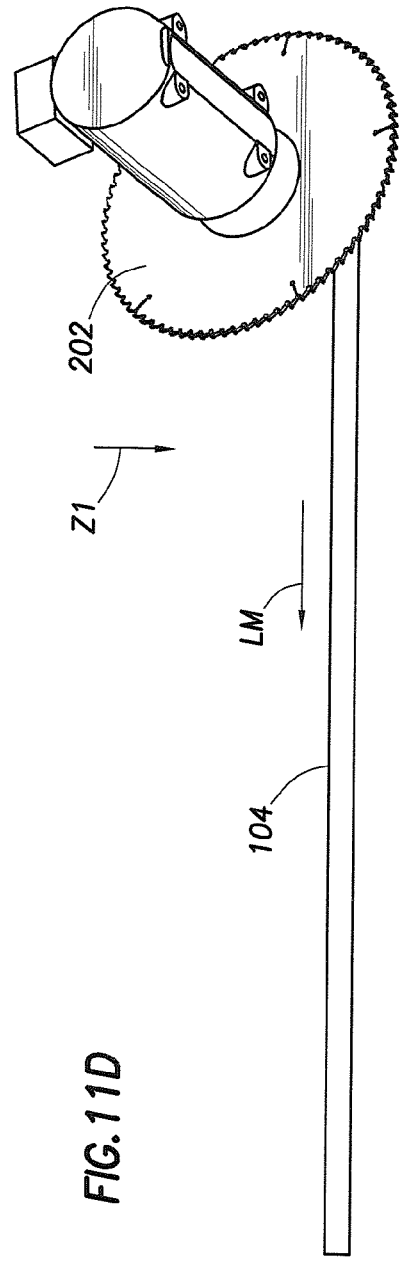

Bevel or compound cuts are also possible at other than 90-degree angles. That is, the cut across the face of the board is not at a 90-degree angle to the intersection between the board edge and face. FIGS. 11A-E show the steps for making a compound or bevel cut made at other than a ninety-degree angle with respect to the face of the workpiece 104. In FIG. 11A, the blade 202 is positioned at the desired angle by rotation around the Z1 axis and along path B1 by rotation about the axis C1. The blade is positioned above the workpiece 104. The cut BC2 is made by simultaneously lowering the blade along axis Z1 into contact with the workpiece 104 and moving the workpiece, left to right, along the linear path LM. A reverse cut BC3 is made in a similar manner, as seen in FIGS. 11C-E, where the blade is positioned, and dropped through the workpiece while the piece is moved along path LM, right to left. In a preferred embodiment the maximum cut C of the blade is longer than the cut length BL, FIG. 12, allowing for just a stab cut to complete the cutting of the workpiece. However, the cut can be made even where the maximum cut is less than the cut length. Where the cut length is greater than the maximum cut, the blade is translated along the T1 axis while the board is moved linearly along path LM. This is similar to the scarf cut described herein.

While the preferred embodiment of the invention has been disclosed with reference to particular cutting enhancements, and methods of operation thereof, it is to be understood that many changes in detail may be made as a matter of engineering choice without departing from the spirit and scope of the invention as defined by the appended claims.

The invention claimed is:

1. A method for automatically cutting a workpiece having opposed faces and edges and a longitudinal axis, the method comprising the steps of:
   automatically positioning a cutting blade by rotating the blade about a vertical axis;
   automatically positioning the cutting blade by rotating about a bevel axis; and
   automatically moving the blade along the vertical axis into cutting contact with the workpiece; and
   automatically stab cutting the workpiece;
   automatically moving the workpiece along its longitudinal axis simultaneous to the step of stab cutting the workpiece; and
   automatically creating a compound angle cut on the workpiece, the compound angle cut at other than a right angle to the faces and edges of the workpiece.

2. A method as in claim 1 further comprising the step of moving the blade automatically along a transverse axis.

3. A method as in claim 1 further comprising the step of automatically moving the cutting blade along a transverse axis simultaneous to moving the workpiece along its longitudinal axis; and
   creating a compound angle scarf cut on the workpiece.

4. A method as in claim 1 further comprising the step of creating a second compound angle cut on the workpiece by simultaneously moving the cutting blade along its vertical axis and moving the workpiece backward along its longitudinal axis.

5. A method as in claim 4 wherein the step of claim 4 occurs after the steps of claim 1.

6. A method as in claim 1 further comprising the step of creating a compound cut on the workpiece, wherein the compound angle cut has a greater length than the maximum cut width of the cutting blade.

7. A method as in claim 1, wherein the step of moving the blade along the vertical axis further comprises moving the blade downward along the vertical axis.

* * * * *